(12) United States Patent
Ito et al.

(10) Patent No.: US 6,649,300 B2
(45) Date of Patent: Nov. 18, 2003

(54) ELECTRODE CATALYST AND ELECTROCHEMICAL DEVICES USING THE SAME

(75) Inventors: Takashi Ito, Ichikawa (JP); Masahai Endou, Ichikawa (JP)

(73) Assignee: N.E. Chemcat Corporation, Tokyo (JP)

( * ) Notice: Subject to any disclaimer, the term of this patent is extended or adjusted under 35 U.S.C. 154(b) by 336 days.

(21) Appl. No.: 09/859,515

(22) Filed: May 18, 2001

(65) Prior Publication Data

US 2001/0055711 A1 Dec. 27, 2001

(30) Foreign Application Priority Data

May 19, 2000 (JP) ........................................ 2000-147434

(51) Int. Cl.[7] ................................................. H01M 8/10
(52) U.S. Cl. ............................. 429/44; 429/40; 429/42; 429/30; 429/33; 502/101; 502/182; 502/185; 204/283; 204/284; 204/282
(58) Field of Search ................................. 502/101, 182, 502/185; 429/40, 44, 42, 30, 33; 204/284, 282, 283, 416, 415, 424, 426, 432

(56) References Cited

U.S. PATENT DOCUMENTS

| | | | | |
|---|---|---|---|---|
| 5,698,488 A | * | 12/1997 | Birbara et al. | ............. 502/185 |
| 6,007,934 A | * | 12/1999 | Auer et al. | .................... 429/44 |
| 6,492,295 B2 | * | 12/2002 | Hitomi et al. | ............. 502/101 |

* cited by examiner

*Primary Examiner*—Bruce F. Bell
(74) *Attorney, Agent, or Firm*—Oblon, Spivak, McClelland, Maier & Neustadt, P.C.

(57) ABSTRACT

An electrode catalyst for fuel cells which comprises a conductive carbon, platinum supported on the conductive carbon in an amount of from 20% by mass to 70% by mass based on the mass of the catalyst, and oxygen bonded chemically to the conductive carbon and present in the range of from 0.7 to 3 in atomic ratio to the platinum. The present electrode catalyst can attain a high activity because the platinum crystallite diameter has been kept small even when the platinum is supported in a large quantity in the amount more than 20% by mass. The catalyst is useful in fuel cells, e.g., solid polymer electrolyte fuel cells.

10 Claims, No Drawings

ELECTRODE CATALYST AND ELECTROCHEMICAL DEVICES USING THE SAME

BACKGROUND OF THE INVENTION

1. Field of the Invention

This invention relates to an electrode catalyst for electrochemical devices such as fuel cells, and its utilization.

2. Description of the Prior Art

Solid polymer electrolyte fuel cells can provide high current density at low temperature, and hence they are on development as power sources of automobiles and also as power sources of cogeneration for public use.

In the solid polymer electrolyte fuel cells, catalysts are used to accelerate electrode reaction at the anode and the cathode, where it is important to improve their activity per unit mass of catalytic metal in order to improve the efficiency and output power or cells and to manufacture cells at a low cost.

In the beginning, it was considered that in solid polymer electrolyte fuel cells only a catalyst present at the joint interface with an electrolyte ion-exchange membrane participated in the electrode reaction. Accordingly, platinum black was used as the catalyst in order to ensure many active sites per unit area of the joint interface. Using this platinum black, an ion-exchange membrane-electrode assembly was formed in which each electrode of the anode and the cathode, comprising a gas diffusion electrode substrate one surface of which is coated with the platinum black, is so joined that the catalyst side of each electrode comes into contact with the ion-exchange membrane. This membrane-electrode assembly used platinum in an amount of 4 to 10 $mg/cm^2$ per unit area of joint interface.

After that, a method was developed in which a catalyst comprised of platinum or a platinum alloy supported on conductive carbon and impregnated with an ion-exchange resin is used in an electrode, and this electrode is joined to an ion-exchange membrane by hot pressing. Thus, it became possible to make the whole catalyst layer with a stated thickness participate in the electrode reaction. The platinum or platinum alloy that this membrane-electrode assembly uses per unit area of joint interface was reduced to an amount of 0.1 to 1.0 $mg/cm^2$, bringing about an improvement in the utilization efficiency of platinum.

In order to attain necessary performance, in such electrode catalysts, the metal component such as platinum or platinum alloys must be supported in an amount of 20 to 70% by mass based on the mass of the catalyst. However, in conventional processes for producing electrode catalysts, the metal component may agglomerate when the platinum or platinum alloy is supported in an amount of 20% by mass or more, so that the crystallite diameter of the metal component may grow. Hence, the performance can not be so much improved for the metal component supported in a large quantity, and no satisfactory performance has been achievable.

In recent years, as an electrode catalyst for solid polymer electrolyte fuel cells, it has been reported that, in respect of catalysts comprised of platinum supported on conductive carbon Vulcan XC-72R (trade name; available from Cabot Corp.) each in an amount of 10, 20, 40, 50 or 60% by mass, the platinum has crystallite diameter of 19, 21, 35, 40 or 55 Å (angstrom), respectively, as measured by X-ray powder diffractometry (J. Electrochem. Soc., Vol.144, No.11, pp.3845–3857, 1997).

It has also been disclosed that, as a process for producing catalyst used for the same purpose, a process in which platinum is reduced by adding sodium thiosulfate to an aqueous chloroplatinic acid solution having conductive carbon suspended therein, followed by treatment at 400° C. in an atmosphere of nitrogen containing 50% by volume of hydrogen, can make platinum have a crystallite diameter of 35 Å, the platinum being that of a catalyst comprised of 30% by mass of platinum supported on conductive carbon having a specific surface area of 300 $m^2/g$ (Japanese Laid-open Publication (Kokai) No. 8-117598).

In general, the higher specific surface area the conductive carbon has, the higher degree of dispersibility the platinum has at the same support percentage (the platinum has a smaller crystallite diameter). With an increase in specific surface area, however, the conductive carbon tends to cause electrochemical oxidative corrosion. It is known to graphitize conductive carbon in order to control such oxidative corrosion from occurring. However, the graphitization of conductive carbon causing the reduction of specific surface area of the resulting carbon, involves a disadvantage that the platinum crystallite diameter grows with an increase in the amount of platinum supported.

In addition to the platinum, platinum alloys are also used as active metal components of electrode catalysts. In the case of reformed-gas fuel cells which generate electricity by feeding to the anode a reformed gas obtained by reforming oxygen-containing hydrocarbons or other hydrocarbons, the platinum alloys are used as metal components for keeping platinum from being poisoned by carbon monoxide inevitably contained in a reformed gas. In the case of direct-methanol fuel cells which generate electricity by feeding to the anode a mixture of methanol and water, the platinum alloys are used as metal components for improving electrochemical oxidation activity to methanol. Also, it has been said that, in the case where platinum is used alone, there is a limit on the improvement of oxygen reduction activity in the cathode even if the platinum is made to have a crystallite diameter as small as possible. Accordingly, it has been studied to use a platinum alloy as a metal component in the cathode, as well.

When the platinum alloy is made supported on a carrier, methods are available in which the platinum and the counterpart metal component comprising the alloy are made supported simultaneously or in which they are made supported one by one. In order to accurately control the amount of platinum supported, a method may be used in which platinum is first made supported and then the counterpart metal component is made supported and thereafter these are alloyed. When the platinum to be first made supported in this method is supported in an amount more than 20% by mass, the platinum crystallite diameter tends to grow and hence the crystallites of the platinum alloy formed by subsequent alloying can not avoid having still larger diameter, bringing about an insufficient improvement in activity.

Thus, in conventional supported platinum electrode catalysts for solid polymer electrolyte fuel cells, the platinum crystallite diameter may greatly grow with an increase in the amount of platinum supported, in the case where the platinum is supported in an amount more than 20% by mass. As the result, the activity can not be so much improved for the platinum supported in a large quantity, bringing about unsatisfactory results especially on the oxygen reduction activity in the cathode.

In conventional supported platinum alloy electrode catalysts, too, there has been a problem that enhancing the amount of platinum supported may make the platinum alloy crystallite diameter greatly grow and any sufficient activity can not be attained.

SUMMARY OF THE INVENTION

The present invention was made in order to solve the above problems. Accordingly, an object of the present invention is to provide an electrode catalyst for electrochemical devices, such as solid polymer electrolyte fuel cells which is able to attain a high activity because the platinum crystallite diameter is kept small even when the platinum is supported in a large quantity in an amount more than 20% by mass.

Another object of the present invention is to provide a precursor for production of an electrode catalyst for electrochemical devices, e.g., solid polymer electrolyte fuel cells, the electrode catalyst being comprised of, as a metal component, a platinum alloy whose crystallite diameter is kept small.

To achieve the above objects, the present invention provides an electrode catalyst which comprises a conductive carbon, platinum supported on the conductive carbon in an amount of from 20% by mass to 70% by mass based on the mass of the catalyst, and oxygen bonded chemically to the conductive carbon and present in the range of from 0.7 to 3 in atomic ratio to the platinum.

The present invention also provides a precursor for supported platinum alloy electrode catalysts for electrochemical devices e.g., solid polymer electrolyte fuel cells which precursor comprises a conductive carbon, platinum supported on the conductive carbon in an amount of from 20% by mass to 70% by mass based on the mass of the precursor, and oxygen bonded chemically to the conductive carbon and present in the range of from 0.7 to 3 in atomic ratio to the platinum.

DESCRIPTION OF THE PREFERRED EMBODIMENTS

The electrode catalyst of the present invention is a supported platinum electrode catalyst for electrochemical devices, e.g., solid polymer electrolyte fuel cells, and is basically composed of conductive carbon, platinum supported on the conductive carbon in a specific quantity, and oxygen bonded chemically to the conductive carbon and present in a specific ratio.

Supported Platinum Electrode Catalyst

Conductive Carbon

The conductive carbon (conductive carbon powder) which is a carrier of the catalyst of the present invention may include, e.g., conductive furnace black, acetylene black and graphite powder. These conductive carbons may usually have a BET specific surface area of from 60 to 1,500 m$^2$/g, and preferably from 80 to 1,300 m$^2$/g. Among these conductive carbons, the graphite powder may usually have crystallite diameter of from 8 to 100 Å, and preferably from 10 to 50 Å. The crystallite diameter termed in the present invention refers to diameter measured according to the Scherrer's equation.

These conductive carbons may also have an oxygen content of usually less than 1% by mass. Oxygen arising from water adsorbed on conductive carbon particles is not included in this value.

Commercially available conductive furnace black includes Vulcan XC-72R and Black Pear 12000 (both available from Cabot Corp.), and Conductex (available from Columbian Chemical Corp.). Commercially available acetylene black includes Denka Acetylene Black, Denka Acetylene Black AB-12 and Denka Acetylene Black AB-7 (all available from Denki Kagku Kogyo Kabushiki Kaisha), and Ketjen Black EC and Ketjen Black EC-DJ600 (both available from Mitsubishi Chemical Corp.). Commercially available graphite powder includes Graphite HS300-M6 (available from Ronza Co.). Also usable are those more highly graphitized by subjecting any of these commercially available conductive carbons to suitable treatment.

In the catalyst of the present invention, platinum (Pt) is supported on the conductive carbon in an amount of from 20 to 70% by mass based on the mass of the catalyst. It may preferably be supported in an amount of from 30 to 60% by moss. If it is supported in an amount less than 20% by mass, the resulting activity per unit mass of the catalyst is insufficient. If it is supported in an amount more than 70% by mass, the platinum crystallite diameter may grow to cause a lowering of activity per unit mass of platinum.

Platinum

In the catalyst of the present invention, the platinum is supported on the conductive carbon in the state of metal. Its presence in the state of metal is ascertained by putting the catalyst of the present invention to measurement by X-ray powder diffractometry and photoelectron spectroscopy. According to the X-ray powder diffractometry, only the platinum in the state of metal is detected, but any diffraction peaks due to the platinum in the state of compounds such as platinum hydroxide or platinum oxides are not detected. According to the photoelectron spectroscopy, with regard to platinum only peaks due to platinum of zero valency are detected. Meanwhile, with regard to oxygen, oxygen bonded to platinum is not detected, but the presence of oxygen bonded to the conductive carbon is ascertained.

The platinum may preferably have a crystallite diameter satisfying the following expression (1):

$$D \leq [(W-20)/2]+20 \qquad (1)$$

wherein D represents crystallite diameter (Å), and W represents amount of platinum supported (% by mass).

Stated more specifically, it is also possible to control the crystallite diameter to be, e.g., 35 Å or smaller, 30 Å or smaller in some cases, and even 25 Å or smaller.

If the platinum crystallite diameter does not satisfy the expression (1), a sufficient activity per unit mass of the catalyst may be attained with difficulty.

Oxygen

The catalyst of the present invention may preferably contain oxygen of from 0.7 to 3 in atomic ratio to the platinum, and may more preferably contain oxygen of from 1.0 to 2.5 in atomic ratio to the platinum. The oxygen is present in the state where it is bonded chemically to the carrier conductive carbon.

The reason why in the electrode catalyst according to the present invention the platinum crystallite diameter can be kept small although the platinum is supported in an amount of as large as 20 to 70% by mass is unknown, but is presumed to be that the oxygen bonded chemically to the conductive carbon keeps the platinum crystallite diameter from growing.

If the oxygen is bonded in too small a quantity, it may less effectively keep the platinum crystallite diameter from growing, and, if it is bonded in too large a quantity, the conductive carbon may excessively be oxidized undesirably.

Thus, in the catalyst of the present invention, the platinum is supported on the conductive carbon in the state where its crystallite diameter is kept small although the platinum is supported in an amount of as large as 20 to 70% by mass.

Hence, an electrode having a large electrochemical metal surface can be obtained, and therefore an electrode having a high activity can be obtained using platinum in a small quantity.

Production of Electrode Catalyst

The catalyst of the present invention is obtained by adding a solution of platinum compound(s) to a slurry containing a conductive carbon, then allowing the platinum compound to react with an alkali, an acid or other reagent to form fine colloidal particles of tetrahydroxoplatinate (II), hexahydroxoplatinate (IV) or a mixture of these (hereinafter these platinates and mixture of two or more of these are generically called "hydroxoplatinate"), allowing the fine colloidal particles to deposit on the conductive-carbon surface, and then wet-reducing the hydroxoplatinate in the slurry by the use of a reducing agent.

In the conductive carbon-containing slurry, the carbon may preferably be in a concentration of 15 g/L or less, and more preferably from 4 to 10 g/L.

The platinum compound used may be any compound without any particular limitations as long as it is capable of forming the fine colloidal particles of hydroxoplatinate by the reaction with an alkali, an acid or other reagent in the conductive carbon-containing slurry. The platinum compound may include, e.g., platinum (II) chloride, platinum (IV) chloride, hexafluoroplatinate (IV), tetrachloroplatinate (II), hexachloroplatinate (IV), hexabromoplatinate (IV), hexaiodoplatinate (IV), ammonium hexachloroplatinate (IV), sodium tetrachloroplatinate (II), sodium hexachloroplatinate (IV), potassium tetrachloroplatinate (II), potassium hexachloroplatinate (IV), platinum (II) hydroxide, platinum (IV) hydroxide, hexahydroxoplatinate (IV), and sodium hexahydroxoplatinate (IV).

One or more of the platinum compounds may be dissolved in a suitable solvent when used. Water is usually used as the solvent. Depending on the type of the platinum compound, any of alcohols, amines, ethers, ketones and carboxylic acids may be used singly or as a mixed solvent thereof with water or other solvent.

In the conductive carbon-containing slurry, the platinum compound may preferably be in a concentration of 15 g/L or less, and preferably from 4 to 10 g/L, in terms of Pt.

The fine colloidal particles of hydroxoplatinate may be formed by, when, e.g., hexachloroplatinate (IV) is used as the platinum compound, adding this compound to the conductive carbon-containing slurry, thereafter adding an excessive sodium hydroxide solution to the resultant slurry, and heating the resultant mixture at 90 to 100° C. for 30 minutes to 3 hours, followed by addition of a weak acid such as a carboxylic acid to adjust the pH to a neutral to weakly acid side. The colloidal particles are deposited on the conductive-carbon surface.

As the wet-reducing agent used when the hydroxoplatinate is reduced, any agent may be used without any particular limitations as long as it is a soluble agent having reductive hydrogen in the molecule. Examples thereof include hydrazine hydrate, hydrazine hydrochloride, formalin, formic acid and hydroquinone.

When the hydroxoplatinate is reduced to the metallic platinum, the reducing agent may preferably be used in an amount of from 0.2 to 1.0 equivalent weight, and more preferably from 0.3 to 0.9 equivalent weight, per equivalent weight of the hydroxoplatinate. The reason why the reduction of platinum takes place even with use of the reducing agent in a quantity smaller than the reduction equivalent weight is unknown. It is presumed that the oxygen having been bonded to the platinum rearranges to the conductive carbon.

At the time of the reduction the temperature of the conductive carbon-containing slurry may appropriately be selected according to the reducing agent to be used. The reduction may be effected for a time until the reducing agent added has been completely consumed.

After the reduction has been completed, the slurry may be filtered, washed and then dried by conventional methods; thus the catalyst of the present invention is obtained.

Utilization of Supported Platinum Electrode Catalyst

The catalyst of the present invention may be used in the preparation of an electrode, either an anode or cathode, for use in any electrochemical device using an electrode, for example a fuel cell, an electrolyser, a, sensor. Accordingly, the present invention also provides an electrode comprising a catalyst of the present invention. The present invention further provides the use of an electrode of the invention in an electrochemical device.

The catalyst of the present invention may be used in both the anode catalyst and the cathode catalyst of the solid polymer electrolyte fuel cell, or may be used in any one of them.

In the case of air/hydrogen fuel cells in which air is fed to the cathode and hydrogen is fed to the anode, the catalyst of the present invention may be used in both the cathode and the anode so that high oxygen reduction activity and high hydrogen oxidation activity can be attained in the cathode and in the anode, respectively.

In the case of reformed-gas fuel cells and direct-methanol fuel cells, the catalyst of the present invention may preferably be used in the cathode.

Supported Platinum Alloy Electrode Catalyst Precursor

The electrode catalyst of the present invention comprises the platinum supported on conductive carbon. The platinum may be alloyed with other metal component(s) so that it can be used to produce a supported platinum alloy electrode catalyst. More specifically, the above supported platinum electrode catalyst can be used as a precursor for production of supported platinum alloy electrode catalysts for solid polymer electrolyte fuel cells.

Accordingly, the present invention also provides a precursor for production of supported platinum alloy electrode catalysts for electrochemical devices, e.g., solid polymer electrolyte fuel cells, which precursor comprises a conductive carbon, platinum supported on the conductive carbon in an amount of from 20% by mass to 70% by mass based on the mass of the precursor, and oxygen bonded chemically to the conductive carbon and present in the range of from 0.5 to 3 in atomic ratio to the platinum.

In order to keep the platinum alloy crystallite diameter as small as possible in the method in which the platinum is first supported and then other metal component (s) is alloyed therewith. it is important that the platinum having been first supported has as small a crystallite diameter as possible before alloying. The precursor of the present invention has the crystallite diameter meeting the above expression (1), and hence the platinum alloy formed after the alloying can be made to have a crystallite diameter kept small, e.g., 60 Å or smaller. Thus, a supported platinum alloy electrode catalyst having a high activity can be obtained.

The counterpart metal component for obtaining the platinum alloy may include, e.g., at least one metal selected from noble metals such as ruthenium, osmium, rhodium, iridium, palladium, gold and silver, and base metals such as molybdenum, tin, tungsten, chromium, manganese, iron, cobalt, nickel, copper, yttrium, lanthanum, cerium aluminum and gallium.

The platinum alloy supported on the conductive carbon may usually be in an amount of from 20 to 80% by mass based on the mass of the resultant supported platinum alloy catalyst.

The supported platinum alloy electrode catalyst is produced, e.g., in the following way. The precursor comprising the platinum supported on the conductive carbon in an amount of from 20 to 70% by mass, and preferably from 20 to 60% by mass, is first prepared. As a matter of course, this precursor may be prepared by the same process as the process for producing the supported platinum electrode catalyst described above. Next, the counterpart metal component which forms an alloy with the platinum having been supported is so supported as to be in an amount of, e.g., from 0.5 to 60% by mass, and preferably from 5 to 40% by mass, based on the mass of the supported platinum alloy catalyst to be obtained, followed by reduction treatment to alloy them. The reduction treatment may usually be effected by making heat treatment in a reducing atmosphere or in an inert gas. Thus, the supported platinum alloy electrode catalyst is obtained.

The kind and proportion of the counterpart metal component forming an alloy with platinum may appropriately selected according to the required properties of the electrode catalyst. These metal components may be alloyed by mating heat treatment in a reducing atmosphere or in an inert gas, e.g., in a stream of any one of hydrogen, nitrogen, argon and helium or a mixed gas of two or more of them, usually at from 200 to 1,000° C., and preferably from 300 to 900° C.

The supported platinum alloy electrode catalyst obtained using the precursor of the present invention can be used as the anode catalyst for reformed-gas fuel cells and direct-methanol fuel cells, and as the cathode catalyst for air/hydrogen fuel cells, reformed-gas fuel cells and direct-methanol fuel cells.

EXAMPLES

The present invention is described below in greater detail with reference to Examples. The present invention is by no means limited to these Examples. In the following Examples and Comparative Examples, "%" refers to "% by mass" unless otherwise noted.

Example 1

Into 2.8 L (liters) of deionized water, furnace black having a BET specific surface area of 240 $m^2/g$ (Vulcan XC-72R, available from Cabot Corp.; oxygen content: 0.92%) was introduced in an amount of 20 g in terms of dry mass to form a slurry. To this slurry, 360 mL of an aqueous hexachloroplatinate (IV) solution containing 23.6 g of Pt was added, and then the resultant mixture was heated with stirring and stirring was continued at 90° C. for 20 minutes. The slurry thus treated was cooled to room temperature, and thereafter 400 mL of an aqueous solution of 32.0 g of sodium hydroxide was dropwise added over a period of 30 minutes. After its addition, the slurry was heated to 98° C. over a period of 40 minutes with stirring and then stirring was continued at 98° C. for 1 hour. The resultant slurry was cooled to room temperatures and thereafter the pH of the slurry was adjusted to 6.5 to 7.0 with dropwise addition of an aqueous 5% acetic acid solution.

Next, 400 mL of an aqueous formalin solution containing 6.5 g of formaldehyde was dropwise added to the slurry. Then, the slurry thus treated was heated to 95° C. over a period of 1 hour with stirring and then stirring was continued at 95° C. for 30 minutes. Thereafter, the slurry was cooled to room temperature and then filtered, and the solid matter was washed with deionized water until the filtrate came to have an electrical conductivity of 10 $\mu s/cm$ or lower. The cake obtained was dried at 95° C. for 16 hours by means of a vacuum dryer, followed by pulverization to obtain 44.8 g of platinum-supporting carbon powder (A-1).

The powder was analyzed to reveal that platinum was in a content of 50.1%, and oxygen 8.8%. Also, in X-ray powder diffractometry, the platinum showed only peaks due to metallic platinum, but any peaks due to platinum oxides and platinum hydroxide were not detected. Also, from a peak Pt(111) having the center around $2\theta=39.6°$, the platinum crystallite diameter was measured to be 18 Å. Elements detected by qualitative analysis made by photoelectron spectroscopy were only the three elements, platinum, oxygen and carbon. Chemical shifts of 4f7/2 and 4f5/2 of platinum showed only the presence of platinum with a valency of 0(zero), and 1s spectra of oxygen showed only the presence of O—H, O—C and O=C bonds, The presence of Pt—O bond was not detected.

Example 2

The procedure of Example 1 was repeated except that the furnace black was replaced with acetylene black having a BET specific surface area of 70 $m^2/g$ (Denka Acetylene Black, available from Denki Kagaku Kogyo; oxygen content: 0.52%), to obtain 44.2 g of platinum-supporting carbon powder (A-2).

In the powder, platinum was in a content of 49.6%, and oxygen 7.3%. The platinum was present in the state of metal, and its crystallite diameter was 20 Å.

Example 3

The procedure of Example 1 was repeated except that the furnace black was replaced with acetylene black having a BET specific surface area of 1,300 $m^2/g$ (Ketjen Black EC-DJ600, available front Mitsubishi Chemical Corporation; oxygen content: 0.59%), to obtain 45.0 g of platinum-supporting carbon powder (A-3).

In the powder, platinum was in a content of 50.3%, and oxygen 6.5%. The platinum was present in the state of metal, and its crystallite diameter was 18 Å.

Example 4

The procedure of Example 1 was repeated except that the amount of the furnace black was changed to 28 g, the amount of the aqueous hexachloroplatinate (IV) solution to 195 mL, containing 12.8 g of Pt, and the amount of the aqueous formalin solution to 215 mL, containing 3.5 g of formaldehyde, to obtain 44.7 g of platinum-supporting carbon powder (A-4).

In the powder, platinum was in a content of 30.1%, and oxygen 5.7%. The platinum was present in the state of metal, and its crystallite diameter was 16 Å.

Example 5

The procedure of Example 1 was repeated except that the amount of the furnace black was changed to 24 g, the amount of the aqueous hexachloroplatinate (IV) solution to 268 mL, containing 17.6 g of Pt, and the amount of the aqueous formalin solution to 295 mL, containing 4.8 g of formaldehyde, to obtain 44.9 g of platinum-supporting carbon powder (A-5).

In the powder, platinum was in a content of 39.8% and oxygen 7.1%. The platinum was present in the state of metal, and its crystallite diameter was 16 Å.

Example 6

The procedure of Example 1 was repeated except that the amount of the furnace black was changed to 16, the amount of the aqueous hexachloroplatinate (IV) solution to 439 mL, containing 28.8 of Pt, and the amount of the aqueous formalin solution to 486 mL, containing 7.9 g of formaldehyde, to obtain 45.2 g of platinum-supporting carbon powder (A-6).

In the powder, platinum was in a content of 60.4%, and oxygen 8.9%. The platinum was present in the state of metal, and its crystallite diameter was 20 Å.

Comparative Example 1

Platinum-supporting carbon powder was produced according to Example 2 described in Japanese Laid-open Publication (Kokai) No. 8-117598.

20 g of acetylene black having a BET specific surface area of 1,300 m$^2$/g (Ketjen Black EC-DJ600, available from Mitsubishi Chemical Corporation; oxygen content: 0.59%) and 2,860 mL of an aqueous chloroplatinic acid solution containing 20 g of platinum (Pt concentration: 7 g/L) were mixed to form a slurry. This slurry was heated to 85 to 90° C. and stirred at that temperature for 30 minutes, followed by cooling to room temperature. Of 205 mL of an aqueous solution containing 32.4 g of sodium thiosulfate, 27 mL was first added to the slurry at one time and, 10 minutes after, the remaining 178 mL of the same was added over a period of 20 minutes. Next, the resultant slurry was vigorously stirred by means of a ultrasonic homogenizer, which was thereafter filtered and the solid matter was washed with deionized water until the filtrate came to have an electrical conductivity of 10 μs/cm or lower. The cake obtained was dried at 95° C. for 16 hours by means of a vacuum dryers followed by heat treatment at 400° C. for 1 hour in a stream of nitrogen containing 10% by volume of hydrogen, to obtain 39.6 g of platinum-supporting carbon powder (B-1).

In the powder, platinum was in a content of 51.2%, and oxygen 0.97%. The platinum was present in the state of metal, and its crystallite diameter was 46 Å.

Comparative Examples 2 to 5

The procedure of Comparative Example 1 was repeated except that the Ketjen Black was replaced with the same furnace black as used in Example 1 and the furnace black and Pt were used in amounts of 28 g and 12 g, respectively (Comparative Example 2), 24 g and 16 g, respectively (Comparative Example 3), 20 g and 20 g, respectively (Comparative Example 4), 16 g and 24 g, respectively (Comparative Example 4), to obtain platinum-supporting carbon powders having characteristics shown below (Table 1).

Example 7

40 g of the platinum-supporting carbon powder (A-1) obtained in Example 1 was introduced into 2.0 L of deionized water to form a slurry. Stirring this slurry, 200 mL of an aqueous iridium chloride solution containing 5.0 g of Ir was dropwise added over a period of 15 minutes. Next, to the resultant slurry, an aqueous 2% sodium hydroxide solution was dropwise added over a period of 1 hour to adjust the pH of the slurry to 7, and then the slurry was heated to 50° C., which was kept at 50° C. for 30 minutes. Thereafter, the resultant slurry was cooled to room temperature, followed by filtration and washing. The cake obtained was dried at 95° C. for 16 hours, followed by heat treatment at 400° C. for 1 hour in a stream of 5% by volume of hydrogen (the remainder: nitrogen) to obtain 42.3 g of platinum-iridium alloy-supporting carbon powder (A-7).

In the powder, platinum was in a content of 48.0%, and iridium 12.0%. Crystallite diameter of the platinum-iridium alloy was 57 Å.

Comparative Example 6

The procedure of Example 7 was repeated except for using the platinum-supporting carbon powder (B-4) obtained in Comparative Example 4, to obtain 44.3 g of platinum-iridium alloy-supporting carbon powder (B-6).

In the powder, platinum was in a content of 45.7%, and iridium 11.3%. Crystallite diameter of the platinum-iridium alloy was 89 Å.

The values of characteristics of the platinum-supporting carbon powders of Examples 1 to 6 and Comparative Examples 1 to 5 are shown in Table 1, and the values of characteristics of the platinum-iridium alloy-supporting carbon powders of Example 7 and Comparative Example 6 are shown in Table 2.

TABLE 1

|  | Platinum supported (% by mass) | Oxygen supported (% by mass) | Oxygen/ platinum (atomic ratio) | Platinum crystallite diameter (Å) |
|---|---|---|---|---|
| Example 1 | 50.1 | 8.8 | 2.1 | 18 |
| Example 2 | 49.6 | 7.3 | 1.8 | 20 |
| Example 3 | 50.3 | 6.5 | 1.6 | 18 |
| Example 4 | 30.1 | 5.7 | 2.3 | 16 |
| Example 5 | 39.8 | 7.1 | 2.2 | 16 |
| Example 6 | 60.4 | 8.9 | 1.8 | 20 |
| Comparative Example 1 | 51.2 | 0.97 | 0.2 | 46 |
| Comparative Example 2 | 29.8 | 1.1 | 0.4 | 37 |
| Comparative Example 3 | 39.7 | 1.7 | 0.5 | 42 |
| Comparative Example 4 | 49.6 | 2.1 | 0.5 | 53 |
| Comparative Example 5 | 59.4 | 2.2 | 0.4 | 65 |

TABLE 2

|  | Platinum supported (% by mass) | Iridium supported (% by mass) | Pt-Ir alloy crystallite diameter (Å) |
|---|---|---|---|
| Example 7 | 48.0 | 12.0 | 57 |
| Comparative Example 6 | 45.7 | 11.3 | 89 |

Performance Evaluation Test

Porous carbon paper (TGP-H-060, available from Toray Industries, Inc.) measuring 60 mm×60 mm and having a thickness of 60 μm, having been water-repellent treated with PTFE (polytetrafluoroethylene, Teflon 30J, available from Mitsui Fluorochemicals Inc.) was prepared as an electrode substrate. The platinum-supporting carbon powders obtained in Examples 1 to 6 and Comparative Examples 1 to 5 and the platinum-iridium alloy-supporting carbon powders of Example 7 and Comparative Example 6 were each formed into a paste by mixing the powder and an aqueous PTFE dispersion in a proportion of powder/PTFE=⅔ in terms of dry mass. This paste was uniformly coated on the whole surface of one side of the above porous carbon paper, followed by drying and baking to form a powder/PTFE mixture layer. Here, this layer was so formed that the platinum or platinum-iridium alloy was in a coating weight of 0.5 mg/cm$^2$ per unit area of the porous carbon paper. Next, a 5% Nafion solution (available from Aldrich Chemical Co., Inc.) in a quantity corresponding to powder/Nafion ratio=⅔ in terms of dry mass (Nafion: trade name of perfluorocarbon sulfonate produced by Du Pont) was uniformly coated on the powder/PTFE mixture layer formed as described above, followed by drying. Thus, eleven kinds of electrodes making use of the platinum-supporting carbon powders of Examples and Comparative Examples were obtained.

Next, the two electrodes obtained using the platinum-supporting carbon powder of Example 1 were superposed on each side of a perfluorosulfonate electrolyte membrane (available from Du Pont; trade name: Nafion 112) in such a way that the layer containing the platinum-supporting carbon powder of the electrode came into contact with the electrolyte membrane, and these were contact-bonded by means of a hot press to obtain a membrane-electrode assembly (MEA-1).

Next, membrane-electrode assemblies MEA-2 to MEA-7 and MEA-8 to MEA-13 were respectively produced in the same manner as the production of the above MEA-1 except that the electrode obtained using the platinum-supporting carbon powder of Example 1 was used on one side of the electrolyte membrane and, on the other side thereof, the electrode obtained using the platinum-supporting carbon powder or platinum-iridium alloy-supporting carbon powder of any of Examples 2 to 7 and Comparative Examples 1 to 6 was used.

Next, the above each membrane-electrode assembly was sandwiched, on its both sides, between grooved gas-distribution plates made of graphite, and further sandwiched, on its outer sides, between stainless-steel plates. Thus, single cells for fuel cells were formed. With regard to MEA-2 to MEA-13, the electrode made using the platinum-supporting carbon powder of Example 1 was used in the anode, and the other electrode was set as the cathode.

Hydrogen moistened with 80° C. saturated steam and air similarly moistened were fed to the anode and the cathode, respectively, at flow rates of 200 mL/minute and 600 mL/minute, respectively, in terms of those in a dry state, and each unit cell was driven. Terminal voltage was measured in a steady state of cell operating temperature of 80° C. and current density of 500 mA/cm$^2$. Results obtained are shown in Table 3.

TABLE 3

| Membrane-electrode assembly | Cathode-side platinum or platinum-iridium alloy-supporting carbon powder | Terminal voltage (mV) |
|---|---|---|
| MEA-1 | Example 1 | 654 |
| MEA-2 | Example 2 | 645 |
| MEA-3 | Example 3 | 661 |
| MEA-4 | Example 4 | 642 |
| MEA-5 | Example 5 | 651 |
| MEA-6 | Example 6 | 658 |
| MEA-7 | Example 7 | 665 |
| MEA-8 | Comparative Example 1 | 624 |
| MEA-9 | Comparative Example 2 | 617 |
| MEA-10 | Comparative Example 3 | 621 |
| MEA-11 | Comparative Example 4 | 613 |
| MEA-12 | Comparative Example 5 | 609 |
| MEA-13 | Comparative Example 6 | 612 |

As can be seen from Table 3, the single cells making use of the membrane-electrode assemblies (MEA-1 to MEA-6) produced using the catalysts of Examples 1 to 6 exhibited high terminal voltages of 642 mV or higher, but on the other hand the single cells making use of the membrane-electrode assemblies (MEA-8 to MEA-12) produced using the catalysts of Comparative Examples 1 to 5 showed low terminal voltages of 624 mV or lower.

As also can be seen from Table 3, the unit cell making use or the membrane-electrode assembly (MEA-7) obtained from the platinum-iridium alloy-supporting carbon powder catalyst (A-7) produced using as a precursor the platinum-supporting carbon powder (A-1) showed a high terminal voltage of 665 mV, but the unit cell making use of the membrane-electrode assembly (MEA-13) obtained using the platinum-iridium alloy-supporting carbon powder catalyst (B-6) of Comparative Example 6 showed quite a low terminal voltage of 612 mV.

As described above, the catalyst of the present invention has a high activity as the electrode catalyst for electrochemical devices because, although the platinum is supported in an amount of as large as 20 to 70% by mass, the growth of platinum crystallite diameter is kept small, e.g., in a crystallite diameter of 35 Å or smaller, even when the amount of platinum supported is enlarged within that range.

The precursor for production of supported platinum alloy electrode catalyst according to the present invention can also provide the supported platinum alloy electrode catalyst having a high activity. Because, although the platinum is supported in an amount of as large as 20 to 70% by mass, the crystallite diameter of the platinum alloy in the supported platinum alloy electrode catalyst obtained using this precursor is kept small, e.g.. in a crystallite diameter of 60 Å or smaller, since the platinum crystallite diameter in the precurson is kept from growing even when the amount of platinum supported is enlarged within that range.

What is claimed is:

1. An electrode catalyst which comprises a conductive carbon, platinum supported on the conductive carbon in an amount of from 20% by mass to 70% by mass based on the mass of the catalyst, and oxygen bonded chemically to the conductive carbon and present in the range of from 0.7 to 3 in atomic ratio to the platinum.

2. The electrode catalyst according to claim 1, wherein said platinum has a crystallite diameter satisfying the following expression (1):

$$D \leq [(W-20)/2]+20 \quad (1)$$

wherein D represents crystallite diameter (Å), and W represents the amount of platinum supported.

3. An electrode comprising an electrode catalyst according to claim 1.

4. A membrane-electrode assembly comprising an electrode according to claim 3.

5. An electrochemical device, comprising an electrode according to claim 3.

6. The electrochemical device according to claim 5, which is a fuel cell, an electrolyser, or a sensor.

7. The electrochemical device according to claim 5, which is a solid polymer electrolyte fuel cell.

8. A precursor for supported platinum alloy electrode catalysts, which precursor comprises a conductive carbon, platinum supported on the conductive carbon in an amount of from 20% by mass to 70% by mass based on the mass of the precursor, and oxygen bonded chemically to the conductive carbon and present in the range of from 0.7 to 3 in atomic ratio to the platinum.

9. A process for producing a supported platinum alloy electrode catalyst, comprising depositing a metal component capable of alloying with the platinum having been supported in said precursor on the electrode catalyst precursor according to claim 8, followed by reduction treatment to form the alloy.

10. The process according to claim 9, wherein said metal component is supported in an amount of from 0.5% by mass to 60% by mass based on the mass of the resultant supported platinum alloy electrode catalyst.

* * * * *

UNITED STATES PATENT AND TRADEMARK OFFICE
CERTIFICATE OF CORRECTION

PATENT NO. : 6,649,300 B2
DATED : November 18, 2003
INVENTOR(S) : Ito et al.

It is certified that error appears in the above-identified patent and that said Letters Patent is hereby corrected as shown below:

<u>Title page,</u>
Item [75], Inventors, should read -- [75] Inventors: Takashi Ito, Ichikawa (JP);
                                                       Masashi Endou, Ichikawa (JP) --

Signed and Sealed this

Sixteenth Day of March, 2004

JON W. DUDAS
*Acting Director of the United States Patent and Trademark Office*